US012704695B2

(12) United States Patent
Yang et al.

(10) Patent No.: US 12,704,695 B2
(45) Date of Patent: Aug. 11, 2026

(54) SPACER AND LENS ASSEMBLY INCLUDING THE SAME

(71) Applicant: SAMSUNG ELECTRO-MECHANICS CO., LTD., Suwon-si (KR)

(72) Inventors: So Mi Yang, Suwon-si (KR); Jae Hyuk Huh, Suwon-si (KR); You Jin Jeong, Suwon-si (KR); Geon Hwi Park, Suwon-si (KR); Joon Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 292 days.

(21) Appl. No.: 18/416,994

(22) Filed: Jan. 19, 2024

(65) Prior Publication Data

US 2024/0361557 A1 Oct. 31, 2024

(30) Foreign Application Priority Data

Apr. 27, 2023 (KR) ........................ 10-2023-0055707

(51) Int. Cl.

*G02B 7/02* (2021.01)
*G02B 13/00* (2006.01)
*G03B 17/12* (2021.01)

(52) U.S. Cl.

CPC ......... *G02B 7/021* (2013.01); *G02B 13/0045* (2013.01); *G03B 17/12* (2013.01)

(58) Field of Classification Search

None

See application file for complete search history.

(56) References Cited

U.S. PATENT DOCUMENTS

| | | | | |
|---|---|---|---|---|
| 9,400,383 | B2 * | 7/2016 | Liang | G02B 27/0025 |
| 2021/0364725 | A1 * | 11/2021 | Chang | G03B 17/17 |
| 2022/0221682 | A1 * | 7/2022 | Yang | G02B 7/021 |

FOREIGN PATENT DOCUMENTS

| | | |
|---|---|---|
| KR | 10-2022-0100253 A | 7/2022 |
| KR | 10-2022-0122237 A | 9/2022 |

* cited by examiner

*Primary Examiner* — Richard H Kim

(74) *Attorney, Agent, or Firm* — NSIP Law

(57) ABSTRACT

A spacer is provided. The spacer includes an opening through which light passes and an internal surface that forms the opening, wherein the internal surface includes a first internal surface having a first curvature portion having a first predetermined curvature and a second internal surface disposed to face the first internal surface in a first direction, perpendicular to an optical axis direction, and having a second curvature portion having a second predetermined curvature, a distance between the first internal surface and the second internal surface is less than a distance between surfaces facing each other in the second direction, intersecting the first direction, and the first curvature portion and the second curvature portion are provided as a pair, corresponding to each other, to form an arc of a circle inscribed on the first internal surface and the second internal surface.

12 Claims, 5 Drawing Sheets

SPACER AND LENS ASSEMBLY INCLUDING THE SAME

CROSS-REFERENCE TO RELATED APPLICATIONS

This application claims the benefit under 35 USC § 119 (a) of Korean Patent Application No. 10-2023-0055707 filed on Apr. 27, 2023 in the Korean Intellectual Property Office, the entire disclosure of which is incorporated herein by reference for all purposes.

BACKGROUND

1. Field

The following description relates to a spacer and a lens assembly including the same.

2. Description of Related Art

Camera modules are typically adopted in portable electronic devices, such as, but not limited to, smartphones.

The camera module includes a lens assembly including a plurality of lenses, and a spacer may be disposed between the plurality of lenses to separate adjacent lenses.

The spacer includes an opening through which light passes. When light passes close to an internal wall of the opening, diffraction may occur, which may cause a flare.

When flare occurs, image quality may deteriorate. Accordingly, it may be beneficial to implement spacers to reduce flare.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a spacer includes an opening through which light passes; and an internal surface that forms the opening, wherein the internal surface includes a first internal surface having a first curvature portion having a first predetermined curvature; a second internal surface disposed to face the first internal surface in a first direction perpendicular to an optical axis direction, and having a second curvature portion having a second predetermined curvature; and a third internal surface and a fourth internal surface facing each other in a second direction perpendicular to the first direction; wherein a distance between the first internal surface and the second internal surface is less than a distance between the third internal surface and the fourth internal surface, and wherein the first curvature portion and the second curvature portion are configured as a pair corresponding to each other, and are configured to form an arc of a circle inscribed on the first internal surface and the second internal surface.

The first curvature portion and the second curvature portion may be configured to have a same radius of curvature.

A center point of the circle may be the same as center points of curvatures of the first curvature portion and the second curvature portion.

Center points of curvatures of the first curvature portion and the second curvature portion may be disposed in the opening.

The spacer may include an outer surface that surrounds the internal surface, wherein the outer surface may include a first outer surface and a second outer surface that face the first internal surface and the second internal surface, respectively, in the first direction; and a third outer surface and a fourth outer surface that face the third internal surface and the fourth internal surface, respectively, in the second direction, wherein the first outer surface and the second outer surface may be configured in a straight line parallel to the second direction, and the third internal surface and the fourth outer surface may be configured to have a predetermined curvature.

The first curvature portion and the second curvature portion may be provided in plural and in equal numbers, and are continuously disposed in the second direction intersecting the first direction on the first internal surface and the second internal surface, respectively.

Each of the plurality of first curvature portions and the plurality of second curvature portions may be configured as a pair facing each other in the first direction, and has a shape that corresponds to each other.

Each of the plurality of first curvature portions may have a same radius of curvature, and each of the plurality of second curvature portions may have a same radius of curvature.

Center points of virtual circles having the plurality of first curvature portions and the plurality of second curvature portions as arcs may be arranged along an imaginary line parallel to the second direction.

The imaginary line may be configured to traverse between the first internal surface and the second internal surface at equal intervals and passes through a center point of the opening.

The spacer may include a protrusion portion including a plurality of protrusions that protrude from the internal surface toward a center of the opening.

The protrusion portion may include a first protrusion portion provided on the first internal surface and the second internal surface; and a second protrusion portion provided on the third internal surface and the fourth internal surface, wherein the first protrusion portion and the second protrusion portion are provided in different sizes.

A height of the first protrusion portion from the internal surface to a vertex of the first protrusion portion may be less than a height of the second protrusion portion from the internal surface to a vertex of the second protrusion portion, or a width of the first protrusion portion may be less than a width of the second protrusion portion.

In a general aspect, a spacer includes an opening through which light passes; and an internal surface that forms the opening, and has a predetermined curvature, wherein the internal surface includes a first internal surface and a second internal surface that face each other in a first direction, perpendicular to an optical axis; and a third internal surface and a fourth internal surface that face each other in a second direction, intersecting the first direction, wherein the first internal surface and the second internal surface are respectively formed as an arc of a virtual first circle, and the third internal surface and the fourth internal surface are respectively formed as an arc of a virtual second circle which has a radius that is different from a radius of the virtual first circle.

The radius of the virtual first circle may be less than the radius of the virtual second circle.

The first internal surface and the second internal surface may be configured as a plurality of arcs in which a plurality of first circles may be continuously arranged in the second direction.

Other features and aspects will be apparent from the following detailed description, the drawings, and the claims.

Figure 1:
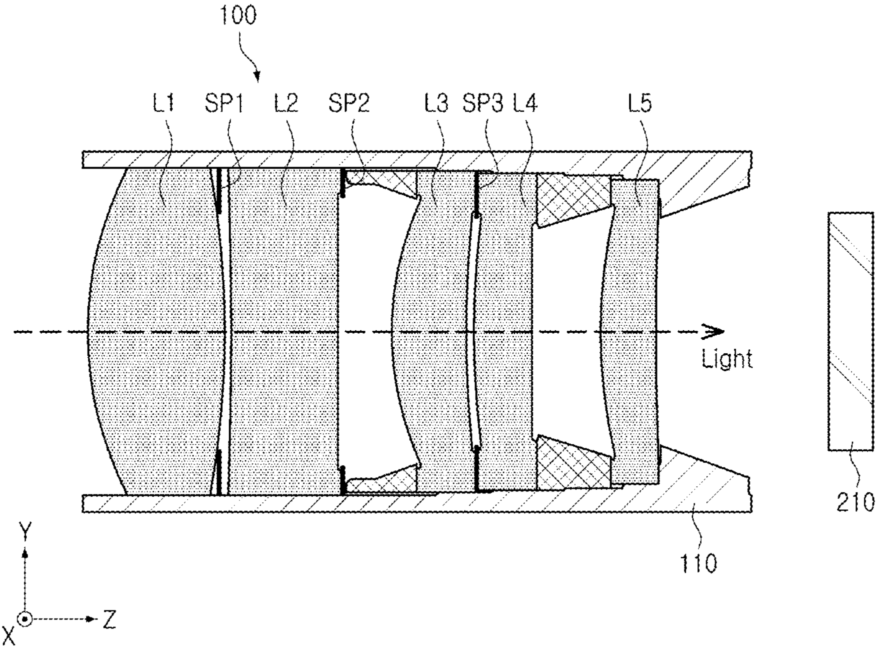
FIG. 1 illustrates a cross-sectional view of an example lens assembly, in accordance with one or more embodiments.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

A camera module in accordance with the one or more embodiments may be mounted on an electronic device. In an example, the camera module may be mounted on a portable terminal, laptop, virtual reality (VR) device, glasses, etc.

However, the electronic devices on which the example camera module may be mounted are not limited to the devices described above. In an example, the camera module may be mounted on any portable electronic device, such as, but not limited to, a portable game console.

One or more examples provide a spacer configured to minimize flare and a lens assembly including the same.

FIG. 1 illustrates a cross-sectional view of an example lens assembly in accordance with one or more embodiments.

An example lens assembly 100 may include a lens barrel 110, on which a plurality of lenses are arranged, and a spacer disposed between the plurality of lenses to separate the space therebetween.

The lens assembly 100 may be disposed in front of an image sensor 210, that is, closer to a subject to be imaged, based on an optical axis direction in which light is incident. The lens assembly 100 and the image sensor 210 may be provided as a camera module.

The plurality of lenses L may include a first lens L1, a second lens L2, a third lens L3, a fourth lens L4, and a fifth lens L5 sequentially arranged inside the lens barrel 110 in order in a direction from the subject to the image sensor 210 based on the optical axis direction (a +Z-axis direction).

The first to fifth lenses L1, L2, L3, L4, and L5 may be arranged inside the lens barrel 110 at preset intervals. At least one spacer SP; (for example, SP1, SP2, and SP3) may be disposed between the first to fifth lenses L1, L2, L3, L4, and L5 to separate the first to fifth lenses and may contact at least a portion of a lens adjacent thereto to support the lens in the optical axis direction.

Light incident on the lens assembly 100 may be refracted, while passing through the plurality of lenses L1, L2, L3, L4, and L5. The refracted light may be incident on the image sensor 210 to acquire an image.

The lens assembly 100, in accordance with one or more embodiments, may include the lens barrel 110, the plurality of lenses L1, L2, L3, L4, and L5 arranged in an axial direction inside the lens barrel 110, and at least one spacer SP (for example, spacer SP1, SP2, and SP3) disposed between the plurality of lenses.

In an example, the spacer SP may be the spacer 10, in accordance with one or more embodiments, which will be described below (see FIGS. 3 to 8). When a plurality of spacers SP are provided, at least one of the plurality of spacers SP1, SP2, and SP3 may be provided as the spacer 10, in accordance with one or more embodiments. The spacer 10, in accordance with one or more embodiments, will be described below.

Although it is shown in FIG. 1 that five lenses are provided, this is only an example. The lens assembly 100, in accordance with one or more embodiments, is not limited to the number of lenses. For example, an example in which two or more lenses are provided and a spacer provided therebetween may correspond to an example embodiment.

The spacers SP1, SP2, and SP3 may block unnecessary light, while separating the plurality of lenses L1, L2, L3, L4, and L5 by a predetermined distance. The spacers SP1, SP2, and SP3 may include a light blocking layer which blocks unnecessary light. In an example, the light blocking layer may be a black film or black iron oxide.

In an example, the spacers SP1, SP2, and SP3 may be formed of a metal material, for example, a non-ferrous metal material. In a non-limited example, the spacers SP1, SP2, and SP3 may be formed of phosphor bronze, but are not limited thereto.

The spacers SP1, SP2, and SP3 may commonly have an opening through which light passes. That is, a space surrounded by internal surfaces of a body of the spacers SP1, SP2, and SP3 may define the opening.

In an example, the internal surface of the spacer, as an internal wall formed to surround the center of the opening, may refer to a surface provided to face in a direction, perpendicular to the direction (the optical axis direction) in which light passes. In other words, it may refer to the internal surface of the body of the spacer SP1, SP2, and SP3 provided in a ring shape.

The shapes and sizes of the spacers SP1, SP2, and SP3 may be the same or may be different.

Additionally, the spacers SP1, SP2, and SP3 of the lens assembly 100, in accordance with one or more embodiments, may be provided as the spacer 10, in accordance with one or more embodiments, which will be described below.

In an example, the lens assembly 100, in accordance with one or more embodiments, may be applied to the camera module 100 implemented with the image sensor 210. In a non-limited example, the lens assembly 100 may be applied to a folded camera module in which a reflective member (not shown) is disposed to be adjacent to the subject so that light is changed in an incident direction at least once by the reflective member and is incident on the lens assembly 100.

In this example, in order to reduce a size of a height corresponding to a thickness direction (a Y-axis direction) of a portable device on which the camera module is mounted, the spacers SP1, SP2, and SP3 may be D-cut into an oak barrel shape (see the spacer of FIGS. 2 to 8).

In the examples, D-cutting refers to forming outer circumferential surfaces of the spacers SP1, SP2, and SP3 to have two straight lines and two curves, thereby reducing the height of the spacers SP1, SP2, and SP3 (a distance between two straight lines in the outer circumferential surfaces). In other words, the overall shape of the outer circumferential surface of the spacers SP1, SP2, and SP3 is formed as the shape of an oak barrel (see FIGS. 2 to 8).

However, as will be described below, the spacer 10, in accordance with one or more embodiments, may also be configured such that a first internal circumferential surface 131 and a second internal circumferential surface 132 are provided to form an arc of a circle (see FIGS. 3 to 8), regardless of D-cutting (that is, regardless of the shape of the outer circumferential surface 15).

Figure 2:
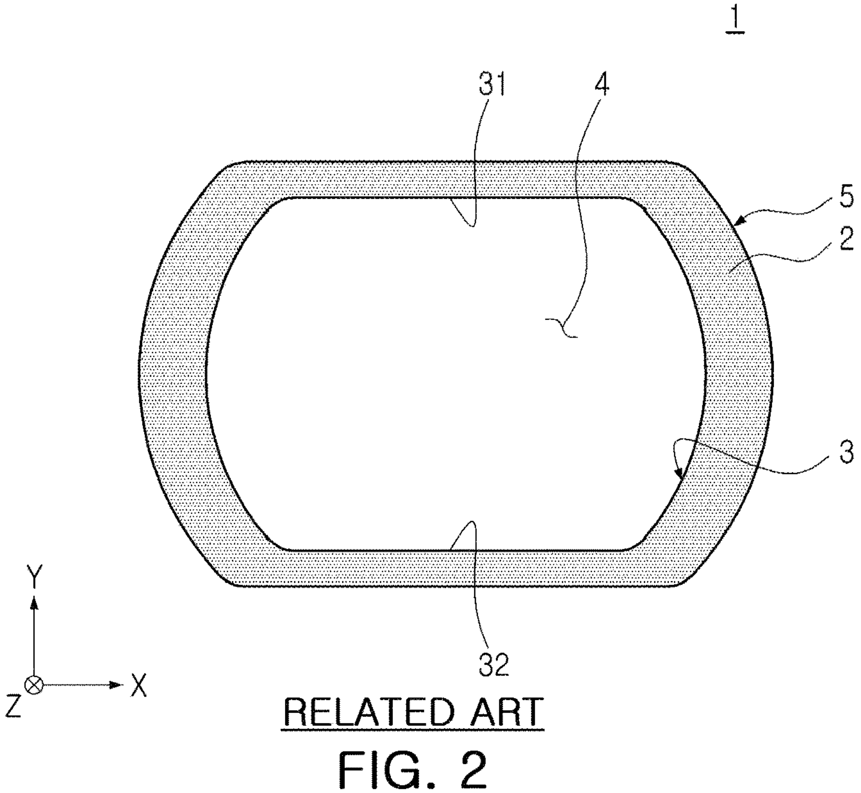
FIG. 2 illustrates a related art spacer viewed in an optical axis direction.

FIG. 2 illustrates a related art spacer viewed in the optical axis direction.

Referring to FIG. 2, the spacer 1 of the related art may include a body 2 having an internal surface 3 that forms an opening 4 and an outer surface 5 that is contactable with the lens barrel 110.

In the internal surface 3 of the spacer 1 of the related art, a first internal surface 31 and a second internal surface 32 facing the first internal surface 31 in a first direction (a Y-axis direction), perpendicular to the optical axis, may be D-cut to have a shape of a straight line.

The first internal surface 31 and the second internal surface 32 of the spacer 1 of the related art are provided in the shape of a straight slit so that light may be diffracted and flat may be more severe on the internal surface disposed in a second direction (an X-axis direction), perpendicular to the second direction.

In other words, the first internal surface 31 and the second internal surface 32, which are provided as straight lines, may intensify the occurrence of flare compared to the curved surface of the internal surface 3 (the surface lying in the X-axis direction).

Figure 3:
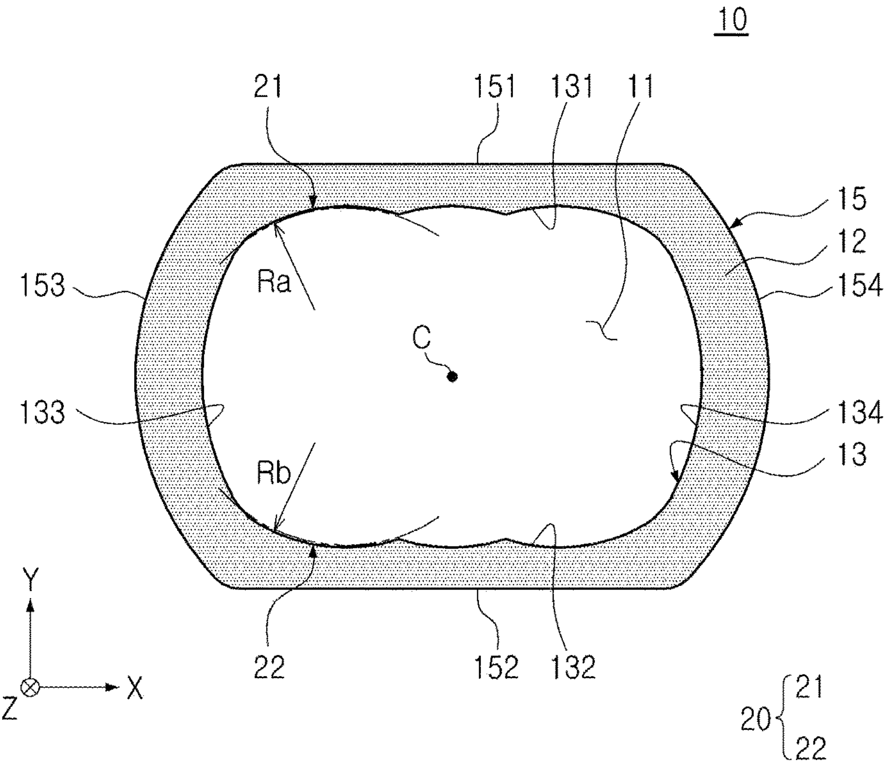
FIG. 3 is a diagram illustrating an example spacer, in accordance with one or more embodiments, viewed in an optical axis direction.

FIG. 3 is a diagram illustrating the spacer 10, in accordance with one or more embodiments, viewed in the optical axis direction.

Referring to FIG. 3, the spacer 10, in accordance with one or more embodiments, may include a body 12 including an opening 11. The body 12 may include an internal surface 13 forming the opening 11 and an outer surface 15 facing the internal surface of the lens barrel 110.

The outer surface 15 may include a first outer surface 151 disposed at the top based on the first direction (a height direction or the Y-axis direction), perpendicular to the optical axis, a second outer surface 152 facing the first outer surface 151, a third outer surface 153 disposed on one side based on the second direction (a width direction or the X-axis direction), perpendicular to the optical axis direction and the first direction, and a fourth outer surface 154 facing the third outer surface 153.

In order to reduce the height (the Y-axis direction) of the spacer 10, in accordance with one or more embodiments, a distance between the first outer circumferential surface 151 and the second outer circumferential surface 152 may be less than a distance between the third outer circumferential surface 153 and the fourth outer circumferential surface 154. In an example, the first outer circumferential surface 151 and the second outer circumferential surface 152 may be D-cut to have a straight shape.

In other words, the spacer 10, in accordance with one or more embodiments, may be configured such that the outer circumferential surface 15 includes two straight lines (the first outer circumferential surface 151 and the second outer circumferential surface 152) and two curves (the third outer circumferential surface 153 and the fourth outer circumferential surface 154). Additionally, the distance between the first outer circumferential surface 151 and the second outer circumferential surface 152 may be less than the distance between the third outer circumferential surface 153 and the fourth outer circumferential surface 154.

However, as described above, it should be understood that the spacer 10, in accordance with one or more embodiments, is not necessarily limited to the shape of the outer circumferential surface 15.

Similarly, the internal surface 13 may include a first internal surface 131 disposed at the top in the first direction (the height direction or the Y-axis direction), a second internal surface 132 facing the first internal surface 131, a third internal surface 133 disposed on one side based on the second direction (the width direction or the X-axis direction), and a fourth internal surface 134 facing the third internal surface 153.

Since the internal surface 13 and the outer surface 15 face each other, the first to fourth internal surfaces 131, 132, 133, and 134 may be disposed to face the first to fourth outer surfaces 151, 152, 153, and 154, respectively.

Additionally, in order to reduce the size of the spacer 10 in the height direction (the Y-axis direction), the distance between the first internal surface 151 and the second internal surface 152, which are arranged to face each other in the first direction, may be less than the distance between the third internal surface 153 and the fourth internal surface 154 arranged to face each other.

In an example, flare that generally occurs, while passing through the spacer, is due to the shape of the internal surface of the spacer through which light passes. In order to minimize the occurrence of flare caused by the internal surface of the spacer, it is advantageous to provide a structure that may disperse light or to have the internal surface formed in a curved shape. In particular, it is preferable in terms of reducing flare that the shape of the internal surface is circular or close thereto.

In an example, as described above in FIG. 2, in the example of the shape of the spacer 1 of the related art, the internal surface portions facing each other in the straight line are provided in the shape of a slit, so flare may become severe.

The spacer 10 according to an exemplary embodiment in the present disclosure, in accordance with one or more embodiments, may have the internal surface formed in one or more circular shapes in order to minimize flare of light passing through the internal surface 13. That is, in accordance with one or more embodiments, the shape of the internal surface 13 may be formed as one or more circular arcs. Additionally, the opening 11 may be formed to have a shape of a plurality of arcs which continuously overlap each other (see O1, O2, O3, and Oi in FIG. 6).

Details thereof will be described below.

The spacer 10, in accordance with one or more embodiments, may include a curvature portion 20 formed with a predetermined curvature on the internal surface 13.

More specifically, the curvature portion 20 may include a first curvature portion 21 having a first curvature Ra on the first internal surface 131 and a second curvature portion 22 having a second curvature Rb on the second internal surface 132.

The curvature portion 20 (21, 22) may be provided respectively on the first internal surface 131 and the second internal surface 132 that face each other at a short distance from the internal surface 13. Since the curvature portion 20 is formed with a predetermined curvature, the occurrence of flare due to diffraction may be reduced compared to an example in which the first internal surface 131 and the second internal surface 132 are provided as straight lines.

In an example, the first curvature portion 21 and the second curvature portion 22 facing each other may be provided as a pair, corresponding to each other, forming at least a portion of a circle. That is, the first curvature portion 21 and the second curvature portion 22 form at least a portion of a circle (R1, see FIG. 5) inscribed in the first internal surface 131 and the second internal surface 132.

Here, "corresponding" means that the first curvature portion 21 and the second curvature portion 22 are arranged as mirror images of each other based on an imaginary line that passes at equal intervals between the first internal surface 131 and the second internal surface 132 in the second direction (the X-axis direction). A center point C of the opening 11 may be disposed on the imaginary line.

Additionally, in an example, the first curvature portion 21 and the second curvature portion 22 may be provided in the same number to correspond to each other.

Additionally, a first radius of curvature Ra of the first curvature portion 21 and a second radius of curvature Rb of the second curvature portion 22 may be provided to be the same. Accordingly, the first curvature portion 21 and the second curvature portion 22 may form an arc of a circle based on the radii of curvature Ra and Rb of the first curvature portion 21 or the second curvature portion 22 as radii.

In an example, the center point of curvature of each of the first and second curvature portions 21 and 22 may be disposed on the opening 11.

Additionally, the center points of curvatures of the first curvature portion 21 and the second curvature portion 22 may be the same. In an example, the center points of the curvatures may be the same as the center point O1 of the circle R1.

In an example, the first curvature portion 21 and the second curvature portion 22 may have the same radius of curvature and may be provided as a pair, corresponding to each other, and may form a portion of a circle (R1, see FIG. 5) simultaneously inscribed on the first internal surface 131 and the second internal surface 132. In other words, they may form an arc of an inscribed virtual circle.

Additionally, the center point (O1, see FIG. 5) of the virtual circle may be the same as the center point of curvature of the first and second curvature portions.

Additionally, the first curvature portion 21 and the second curvature portion 22 may be provided in plural. This is advantageous in terms of incident light amount because the size of the opening 11 increases.

More specifically, when the first curvature portion 21 and the second curvature portion 22 are provided in plural rather than one each, the amount of light passing through the opening 11 may increase compared to when a single first curvature portion 21 and a single second curvature portion 22 are formed, and therefore, it is possible to reduce the distance between the first internal surface 131 and the second internal surface 132, while minimizing the loss of F value caused thereby.

In other words, when D cutting is performed to reduce the height (the Y-axis direction) of the spacer 11, the distance between the first internal surface 131 and the second internal surface 132 is reduced to be shorter than the distance between the third internal surface 133 and the fourth internal surfaces 134. In this example, there is an advantage in terms of reducing the thickness of the spacer, but the size of the opening 11 is reduced due to the decrease in the distance between the first internal surface 131 and the second internal surface 132, resulting in a loss of the F value.

Accordingly, when a plurality of first curvature portions 21 and second curvature portions 22 are provided on each of the first internal surface 131 and the second internal surface 132, the area of the opening 11 is increased by that much, so that the loss of F value may be minimized and flare may be effectively reduced by the curvature portion 20.

Figure 5:
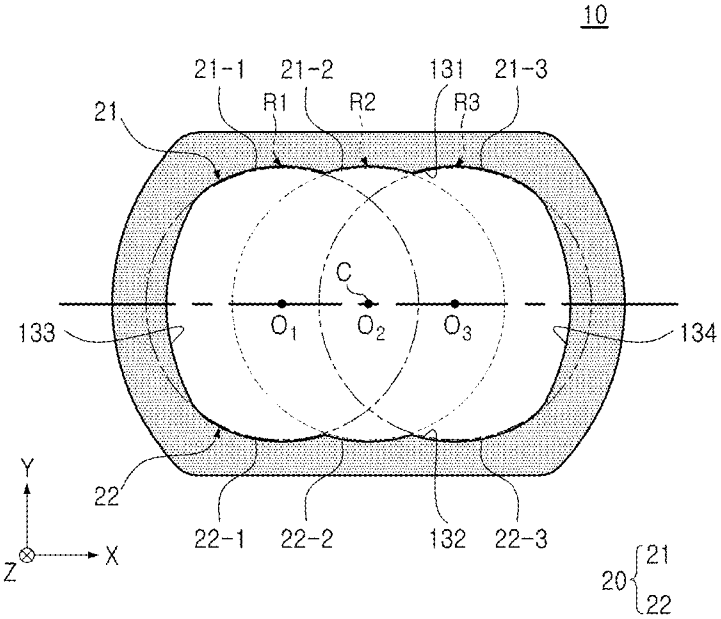
FIG. 5 illustrates a virtual circle formed by a curvature portion.

Additionally, when a plurality of the first curvature portions 21 and the second curvature portions 22 are provided in the same number, the first curvature portions 21 and the second curvature portions 22 facing each other may correspond to each other to form a circle (see R1, R2, and R3 in FIG. 5).

In an example, when a plurality of first curvature portions 21 and second curvature portions 22 are provided, the plurality of first curvature portions 21 and second curvature portions 22 may be continuously arranged in the second direction on the first internal surface 131 and the second internal surface 132. In FIG. 3, three first curvature portions 21 and three second curvature portions 22 are continuously provided in the second direction, and in FIG. 7, four first curvature portions 21 and four second curvature portions 22 are continuously provided in the second direction.

Additionally, when a plurality of first curvature portions 21 and a plurality of second curvature portions 22 are provided, the radii of curvature of the plurality of first curvature portions 21 and the plurality of second curvature portions 22 corresponding to each other may be the same. Additionally, in an example, the radii of curvature of each of the plurality of first curvature portions 21 and the plurality of second curvature portions 22 may be the same.

In an example, as will be described below, the third internal surface 133 and the fourth internal surface 134 may be provided to have a predetermined curvature and may be provided to form at least a portion of an inscribed circle (see Ri in FIG. 6).

Figure 4:
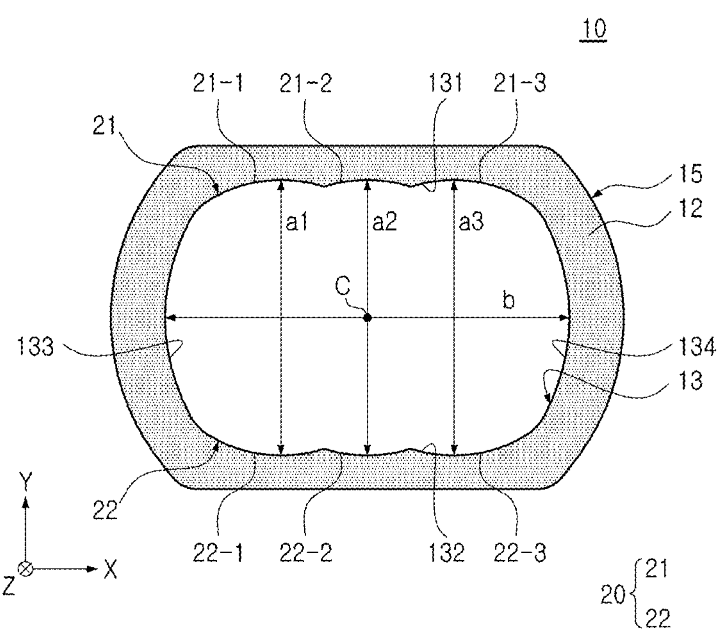
FIG. 4 illustrates a distance between internal surfaces.
Figure 6:
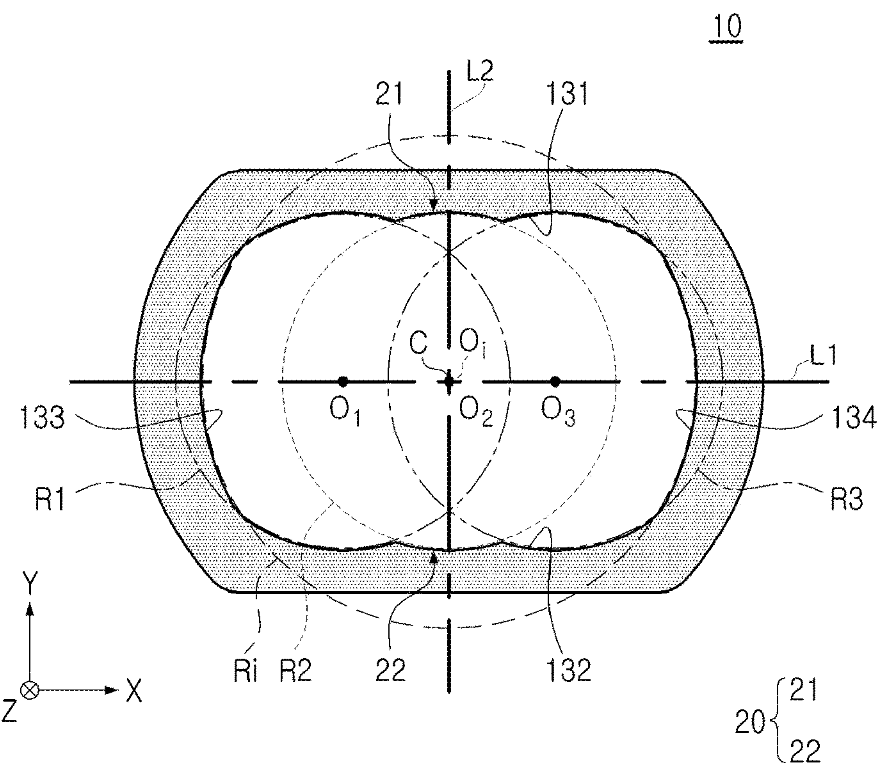
FIG. 6 illustrates all the virtual circles formed inside an internal surface.

FIG. 4 illustrates a distance between internal surfaces, FIG. 5 illustrates a virtual circle formed by a curvature portion, and FIG. 6 illustrates all virtual circles formed inside the internal surface.

Referring to FIGS. 4 and 5, each of the first curvature portion 21 and the second curvature portion 22 may be provided in plural. At this time, in order to minimize the occurrence of flare, the first curvature portions and the second curvature portions 22 may be provided in equal numbers to correspond to each other.

In an example, the first curvature portion 21 may include three first curvature portions 21-1, 21-2, and 21-3, and the second curvature portion 22 may also include three first curvature portions 22-1, 22-2, and 22-3.

As described above, the radii of curvature of the plurality of first curvature portions 21-1, 21-2, and 21-3 may be the same. Similarly, the radii of curvature of the plurality of second curvature portions 22-1, 22-2, and 22-3 may be the same. That is, even if a plurality of first and second curvature portions 21 and 22 are provided, they may all have the same radius of curvature.

Referring to FIG. 4, in a non-limited example, a first distance a1 between the first curvature portion 21-1 and the second curvature portion 22-1 disposed to be closest to the third internal surface 133, a third distance a3 between the first curvature portion 21-3 and the second curvature portion 22-3 disposed to be closest to the fourth internal surface 134, and a second distance a2 between the first curvature portion 21-2 and the second curvature portion 22-2 disposed therebetween may all be the same.

In an example, the first to third distances a1, a2, and a3 which may be the longest distances, parallel to the first direction between the curvature portions 20, may be diameters of the first to third circles (see R1, R2, and R3 in FIG. 6) respectively formed by the first curvature portions 21-1, 21-2, and 21-3 and the second curvature portions 22-1, 22-2, and 22-3.

That is, in an example, the first distance a1, the second distance a2, and the third distance a3 may be the same, and the first to third distances a1, a2, and a3 may be less than a distance b between the third internal surface 133 and the fourth internal surface 134.

In an example, the distance b may be the greatest distance between the third internal surface 133 and the fourth internal surface 134 parallel to the second direction, and may be disposed within the third internal surface 133 and the fourth internal surface 134. It may be the diameter of a tangential circle (RI, see FIG. 6).

Accordingly, the first internal surface 131 and the second internal surface 132 may be formed in a shape in which portions of the same circular arc are repeated.

Referring to FIG. 5, a first circle R1 having the first distance a1 as a diameter, a second circle R2 having the second distance a2 as a diameter, and a third circle R3 having the third distance a3 as a diameter are illustrated.

The first to third circles R1, R2, and R3 are all circles inscribed together on the first internal surface 131 and the second internal surface 132, and the center points O1, O2, and O3 of the circles may be arranged side-by-side in the second direction (the X-axis direction).

At this time, the center points O1, O2, and O3 of each circle may all be disposed on an imaginary line traversing between the first internal surface 131 and the second internal surface 132 in the second direction at equal intervals. The imaginary line may pass through the center point C of the opening 11.

At this time, in an example, a distance between the first center point O1 and the second center point O2 and a distance between the second center point O2 and the third center point O3 may be the same.

In an example, the position of the center point C of the opening 11 may be determined by the shape or size of the internal surface 13, regardless of the shape of the outer circumferential surface 15. That is, since the opening 11 is formed by the internal surface 13, the position of the center point C of the opening 11 may also be determined by the internal surface 13. That is, the center point C of the opening 11 may refer to the center of the opening 11.

In an example, the center point C may refer to an intersection point of a first imaginary line (L1, see FIG. 6) traversing between the third internal surface 133 and the fourth internal surface 134 at equal intervals in the second direction, and a second imaginary line (L2, see FIG. 6) traversing between the first internal surface 131 and the second internal surface 132 at equal intervals in the first direction.

As another example, the center point C may be the center of a circle having, as a diameter, the distance (b, see FIG. 4) between the third internal surface 133 and the fourth internal surface 134, that is, the center Oi of the circle Ri inscribed on the third internal surface 133 and the fourth internal surface 134 formed as curves (see FIG. 6). The plurality of first curvature portions 21-1, 21-2, and 21-3 and the plurality of second curvature portions 22-1, 22-2, and 22-3 may each have the same radius of curvature in the portions facing each other, and may face each other in the first direction (the Y-axis direction) to form a portion of the circles R1, R2, and R3 simultaneously inscribed on the first internal surface 131 and the second internal surface 132.

In other words, the first internal surface 131 and the second internal surface 132 may be part of a circular arc having the same radius of curvature by the plurality of first curvature portions 21-1, 21-2, and 21-3 and the plurality of second curvature portions 22-1, 22-2, and 22-3.

That is, the first curvature portion 21 and the second curvature portion 22 may form an arc provided on the first internal surface 131 and the second internal surface 132.

In an example, the first to third circles R1, R2, and R3 and the imaginary line should be understood as virtual circles expressed to specifically describe the shape of the internal surface 13.

Referring to FIG. 6, the third internal surface 133 and the fourth internal surface 134 may also have a predetermined curvature, and may be provided in an arc shape.

In other words, in accordance with one or more embodiments, the first internal surface 131 and the second internal surface 132 may be formed to have a plurality of curved surfaces, while the third internal surface 133 and the fourth internal surface 134 may be formed to have a single curved surface.

In an example, the third internal surface 133 and the fourth internal surface 134 may form a portion of a circle in which the distance b between the third internal surface 133 and the fourth internal surface 134 is a diameter. That is, the third internal surface 133 and the fourth internal surface 134 may have the same radius of curvature, and may form an arc of the circle Ri having the radius of curvature as a radius.

In other words, the third internal surface 133 and the fourth internal surface 134 may be inscribed together in the circle Ri having the center point Oi of the arc described above as a center point. In an example, the circle Ri may match the center point C of the opening 11.

Additionally, when the radius of curvature formed by the first internal surface 131 and the second internal surface 132 by the curvature portion 20 is referred to as a first radius of curvature and the radius of curvature formed by the third internal surface 133 and the fourth internal surface 134 is referred to as a second radius of curvature, the first radius of curvature may be less than the second radius of curvature.

Due to the shapes of the first to fourth internal surfaces 131, 132, 133, and 134, the internal surface 13 of the spacer 10, in accordance with one or more embodiments, may entirely have the arc of the inscribed circles R1, R2, R3, and Ri. In an example, the radii of R1, R2, R3, and Ri may be different from each other.

Since flare due to diffraction when light passes through the arc of a circle may be minimized, the spacer 10, in accordance with one or more embodiments, may minimize the occurrence of flare due to diffraction based on this structure.

In an example, if the number of the first curvature portion 21 and the second curvature portion 22 is odd, the center point O2 of the circle R2 disposed at the center may match the center point C of the opening 11, as shown in FIG. 6.

In accordance with one or more embodiments, the body 12 is not limited to the oak barrel shape in which the body 12 is D-cut as described above so that the outer surface 15 has two straight portions and two curved portions.

In an example, if the first curvature portion 21 and the second curvature portion 22 are provided in a shape that forms a portion of a circle inscribed with each other as described above, the body 12 may have various shapes, such as, but not limited to, a polygonal shape or an elliptical shape.

In other words, if the opening 11 through which light passes is formed by a plurality of circular arcs inscribed on the internal surface 13 as shown in FIG. 6, the shape of the body 12 may be applied variously.

Figure 7:
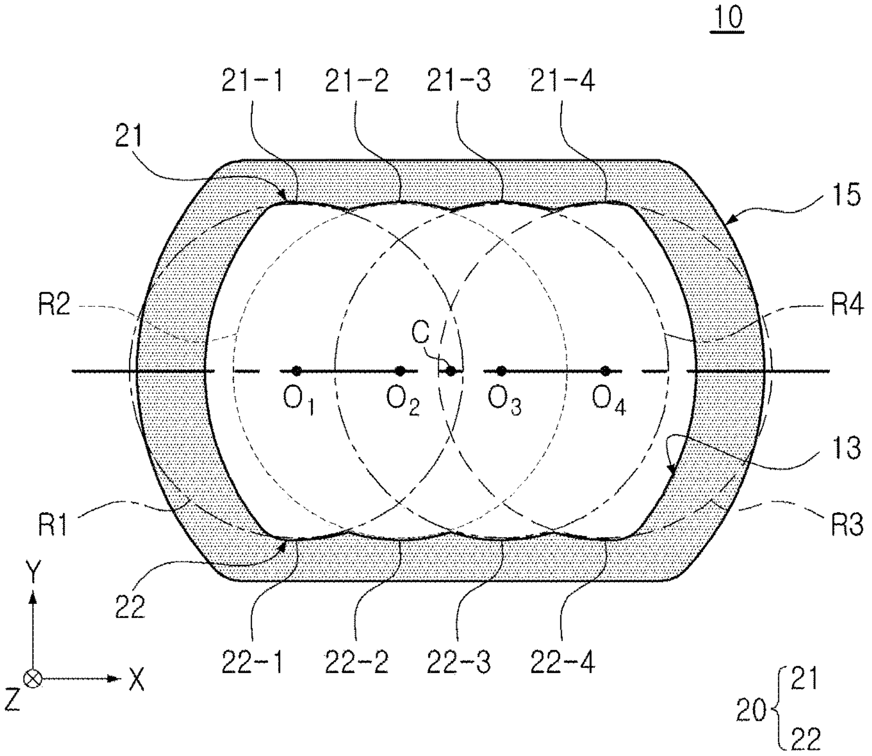
FIG. 7 is a diagram in which the number of curvature portions of a spacer is increased.

FIG. 7 is a diagram in which the number of curvature portions of the spacer is increased.

As described above, the number of first curvature portions 21 and second curvature portions 22 of the one or more examples is not limited to a specific number as long as the first curvature portions 21 and second curvature portions 22 are provided in plural. Referring to FIG. 7, the first curvature portion 21 and the second curvature portion 22 may include four first curvature portions 21-1, 21-2, 21-3, and 21-4 and four second curvature portions 22-1, 22-2, 22-3, and 22-4. In this example, four circles R1, R2, R3, and R4 inscribed together on the first internal surface 133 and the second internal surface 134 may also be provided.

In this example, the area of the openings 11 may increase compared to a case in which three first curvature portions and three second curvature portions are provided, so the amount of incident light may increase.

However, the spacer 10, in accordance with one or more embodiments, is not limited to the number of the first curvature portion 21 and the second curvature portion 22, and any example in which the first curvature portion 21 and the second curvature portion 22 form an arc of a circle may correspond to the present disclosure.

Figure 8:
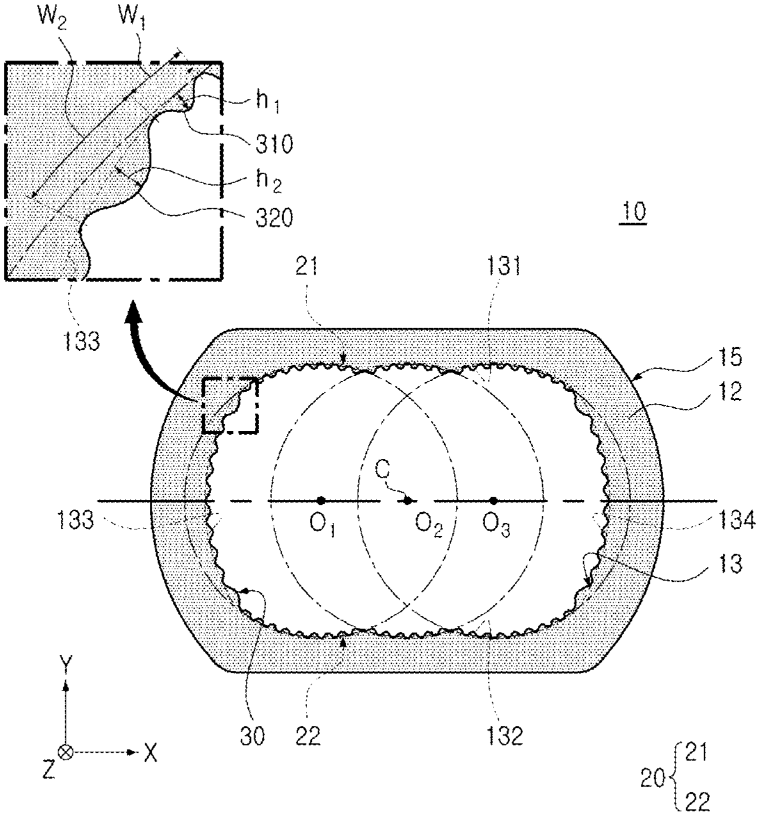
FIG. 8 illustrates a modified example of a spacer, in accordance with one or more embodiments.

FIG. 8 illustrates a modified example of a spacer.

Referring to FIG. 8, the internal surface 13 may include a protrusion portion 30 including a plurality of protrusions protruding toward the center of the opening 11. In a non-limited example, the protrusion portion 30 may protrude in a convex shape at equal intervals from the internal surface 13.

In an example, the plurality of protrusions may be provided in a convex shape, and when adjacent protrusions are connected, the protrusions may be provided in a continuous wave-shape.

When all the vertices of the plurality of protrusions are connected, the internal circumferential surface 13 may be formed in the shape of a circular arc. In other words, when a plurality of vertices are connected, a plurality of identical circles having the center point as that of the circles R1, R2, R3, and Ri each having the center point inscribed on the internal circumferential surface 13 may be formed. Additionally, when the lowest points of the plurality of protrusions are all connected, the internal circumferential surface 13 may be formed.

In an example, the vertex may refer to the most protruding portion of each protrusion. For example, the vertex may refer to a portion of each protrusion closest to the center of the opening 11.

The protrusion portion 30 includes a first protrusion portion 310 formed on the first internal surface 131 and the second internal surface 132 provided with the curvature portion 20 and a second protrusion portion 320 formed on the third internal surface 133 and the fourth internal surface 134.

Referring to the partially enlarged view of FIG. 8, a distance h1 from the first internal surface 131 (or the second internal surface 132) to the vertex of the first protrusion portion 310 may be less than a distance h2 from the third internal surface 133 (or the fourth internal surface 134) to the vertex of the second protrusion portion 320. In an example, h1 may refer to the maximum height of the first protrusion portion 310, and h2 may refer to the maximum height of the second protrusion portion 320.

Additionally, a width w1 of the first protrusion portion 310 may be less than a width w2 of the second protrusion portion 320. Accordingly, the plurality of protrusions of the first protrusion portion 310 may be formed more densely than the plurality of protrusions of the second protrusion portion 320.

In an example, the width may refer to a distance between portions in which the height of each protrusion is 0.

In an example, in FIG. 8, the shape of the protrusion is shown as having a wave shape protruding convexly toward the center of the opening 11. However, the protrusion may have various other shapes, such as a sawtooth shape, etc., as long as the protrusion repeatedly protrudes from the internal surface 13 toward the center of the opening 11.

The spacer and the lens assembly including the same, in accordance with one or more embodiments, may minimize flare.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A spacer, comprising:

an opening through which light passes; and an internal surface that forms the opening, wherein the internal surface comprises:

a first internal surface having a first curvature portion having a first predetermined curvature;

a second internal surface disposed to face the first internal surface in a first direction perpendicular to an optical axis direction, and having a second curvature portion having a second predetermined curvature; and a third internal surface and a fourth internal surface facing each other in a second direction perpendicular to the first direction;

wherein a distance between the first internal surface and the second internal surface is less than a distance between the third internal surface and the fourth internal surface, and wherein the first curvature portion and the second curvature portion are configured as a pair corresponding to each other, and are configured to form an arc of a circle inscribed on the first internal surface and the second internal surface, wherein the first curvature portion and the second curvature portion are provided in plural and in equal numbers, and are continuously disposed in the second direction intersecting the first direction on the first internal surface and the second internal surface, respectively, wherein center points of virtual circles having the plurality of first curvature portions and the plurality of second curvature portions as arcs are arranged along an imaginary line parallel to the second direction, and wherein the imaginary line is configured to traverse between the first internal surface and the second internal surface at equal intervals and passes through a center point of the opening.

2. The spacer of claim 1, wherein the first curvature portion and the second curvature portion are configured to have a same radius of curvature.

3. The spacer of claim 1, wherein a center point of the circle is the same as center points of curvatures of the first curvature portion and the second curvature portion.

4. The spacer of claim 1, wherein center points of curvatures of the first curvature portion and the second curvature portion are disposed in the opening.

5. The spacer of claim 1, further comprising:

an outer surface that surrounds the internal surface, wherein the outer surface comprises:

a first outer surface and a second outer surface that face the first internal surface and the second internal surface, respectively, in the first direction; and a third outer surface and a fourth outer surface that face the third internal surface and the fourth internal surface, respectively, in the second direction, wherein:

the first outer surface and the second outer surface are configured in a straight line parallel to the second direction, and the third outer surface and the fourth outer surface are configured to have a predetermined curvature.

6. The spacer of claim 1, wherein each of the plurality of first curvature portions and the plurality of second curvature portions is configured as a pair facing each other in the first direction, and has a shape that corresponds to each other.

7. The spacer of claim 1, wherein:

each of the plurality of first curvature portions has a same radius of curvature, and each of the plurality of second curvature portions has a same radius of curvature.

8. The spacer of claim 1, further comprising a protrusion portion including a plurality of protrusions that protrude from the internal surface toward a center of the opening.

9. The spacer of claim 8, wherein:

the protrusion portion comprises:

a first protrusion portion provided on the first internal surface and the second internal surface; and a second protrusion portion provided on the third internal surface and the fourth internal surface, wherein the first protrusion portion and the second protrusion portion are provided in different sizes.

10. The spacer of claim 9, wherein a height of the first protrusion portion from the internal surface to a vertex of the first protrusion portion is less than a height of the second protrusion portion from the internal surface to a vertex of the second protrusion portion, or a width of the first protrusion portion is less than a width of the second protrusion portion.

11. A spacer, comprising:

an opening through which light passes; and an internal surface that forms the opening, and has a predetermined curvature, wherein the internal surface comprises:

a first internal surface and a second internal surface that face each other in a first direction, perpendicular to an optical axis; and a third internal surface and a fourth internal surface that face each other in a second direction, intersecting the first direction, wherein the first internal surface and the second internal surface are respectively formed as an arc of a virtual first circle, and the third internal surface and the fourth internal surface are respectively formed as an arc of a virtual second circle which has a radius that is different from a radius of the virtual first circle, wherein the first internal surface and the second internal surface are configured as a plurality of arcs in which a plurality of first virtual circles are continuously arranged in the second direction, and wherein center points of the plurality of first virtual circles are arranged along an imaginary line parallel to the second direction, and the imaginary line traverses between the first internal surface and the second internal surface at equal intervals and passes through a center point of the opening.

12. The spacer of claim 11, wherein the radius of the virtual first circle is less than the radius of the virtual second circle.

* * * * *